(12) United States Patent
Cunningham et al.

(10) Patent No.: US 7,272,598 B2
(45) Date of Patent: *Sep. 18, 2007

(54) STRUCTURED INDEXES ON RESULTS OF FUNCTION APPLICATIONS OVER DATA

(75) Inventors: Conor J. Cunningham, Redmond, WA (US); Eric N. Hanson, Bellevue, WA (US); Milind M. Joshi, Redmond, WA (US); Cesar A. Galindo-Legaria, Redmond, WA (US); Florian M. Waas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 106 days.

This patent is subject to a terminal disclaimer.

(21) Appl. No.: 11/096,149

(22) Filed: Mar. 31, 2005

(65) Prior Publication Data

US 2005/0198019 A1    Sep. 8, 2005

Related U.S. Application Data

(63) Continuation of application No. 10/795,623, filed on Mar. 8, 2004.

(51) Int. Cl.
*G06F 17/30* (2006.01)
(52) U.S. Cl. .................................. 707/3; 707/2; 707/5
(58) Field of Classification Search .................... 707/3, 707/2, 5
See application file for complete search history.

(56) References Cited

U.S. PATENT DOCUMENTS 5,991,754 A * 11/1999 Raitto et al. .................... 707/2
6,334,128 B1 * 12/2001 Norcott et al. ................. 707/5
6,356,920 B1 * 3/2002 Vandersluis ............... 715/501.1
6,477,525 B1 * 11/2002 Bello et al. ..................... 707/3
6,493,708 B1 * 12/2002 Ziauddin et al. ............... 707/3
6,496,819 B1 * 12/2002 Bello et al. ..................... 707/3
6,505,189 B1 * 1/2003 On Au et al. ................... 707/2
6,643,636 B1 * 11/2003 Au et al. ........................ 707/2
6,708,186 B1 * 3/2004 Claborn et al. ............. 707/102

(Continued)

*Primary Examiner*—Don Wong
*Assistant Examiner*—Thanh-Ha Dang
(74) *Attorney, Agent, or Firm*—Woodcock Washburn LLP

(57) ABSTRACT

Indexed views or materialized views are used as a secondary index on a base table with multi-valued attributes. This provides for using the index to search in the nested data. Moreover, indexing is provided on the result of an unnest operation. Indexing a view on the result of an unnesting operation provides the ability to index the contents of a nested collection. One such unnesting operation is "cross apply unnest". This provides additional options for a query execution plan, leading to a more optimized query. A back-join is provided from the indexed view to the base table to allow fields from the base table that are not present in the indexed view to be included in a result of a query on the table which is processed using the indexed view as an access path. This provides a means of including columns in the query result that are not in the indexed view but are in the base table. The back-join is supported from a single-table indexed view to the base table via a unique clustering key which acts as a logical row locator. Thus, the system can back-join to the base table from an indexed view via the unique clustering key. These features allow the use of indexed views to index a table on the contents of multi-set or multi-valued attributes.

6 Claims, 9 Drawing Sheets

U.S. PATENT DOCUMENTS

| | | | |
|---|---|---|---|
| 6,785,673 B1 * | 8/2004 | Fernandez et al. | 707/3 |
| 6,850,933 B2 * | 2/2005 | Larson et al. | 707/4 |
| 6,934,712 B2 * | 8/2005 | Kiernan et al. | 707/102 |
| 7,043,499 B1 * | 5/2006 | Nelson et al. | 707/102 |
| 7,120,645 B2 * | 10/2006 | Manikutty et al. | 707/102 |
| 7,127,469 B2 * | 10/2006 | Lindblad et al. | 707/102 |
| 2001/0047372 A1 * | 11/2001 | Gorelik et al. | 707/514 |
| 2003/0154189 A1 * | 8/2003 | Egilsson et al. | 707/1 |
| 2004/0122804 A1 * | 6/2004 | Zhang et al. | 707/3 |
| 2005/0097084 A1 * | 5/2005 | Balmin et al. | 707/3 |
| 2005/0114307 A1 * | 5/2005 | Le et al. | 707/3 |

* cited by examiner

STRUCTURED INDEXES ON RESULTS OF FUNCTION APPLICATIONS OVER DATA

CROSS REFERENCE TO RELATED APPLICATIONS

The present application is a continuation of application Ser. No. 10/795,623 filed Mar. 8, 2004 for "STRUCTURED INDEXES ON RESULTS OF FUNCTION APPLICATIONS OVER DATA".

TECHNICAL FIELD

The present invention relates generally to the field of information storage and retrieval, and, more particularly, to efficient searching of the stored data.

BACKGROUND

Consumers use their computers primarily for communication and organizing personal information, whether it is traditional personal information manager (PIM) style data or media such as digital music or photographs. The amount of digital content, and the ability to store the raw bytes, has increased tremendously; however, the methods available to consumers for organizing and unifying this data has not kept pace. Knowledge workers spend enormous amounts of time managing and sharing information, and some studies estimate that knowledge workers spend 15-25% of their time on non-productive information related activities. Other studies estimate that a typical knowledge worker spends about 2.5 hours per day searching for information.

Traditional approaches to the organization of information in computer systems have centered on the use of file-folder-and-directory-based systems ("file systems") to organize files into directory hierarchies of folders based on an abstraction of the physical organization of the storage medium used to store the files. The Multics operating system, developed during the 1960s, can be credited with pioneering the use of the files, folders, and directories to manage storable units of data at the operating system level. Specifically, Multics used symbolic addresses within a hierarchy of files (thereby introducing the idea of a file path) where physical addresses of the files were not transparent to the user (applications and end-users). This file system was entirely unconcerned with the file format of any individual file, and the relationships amongst and between files were deemed irrelevant at the operating system level (that is, other than the location of the file within the hierarchy). Since the advent of Multics, storable data has been organized into files, folders, and directories at the operating system level. These files generally include the file hierarchy itself (the "directory") embodied in a special file maintained by the file system. This directory, in turn, maintains a list of entries corresponding to all of the other files in the directory and the nodal location of such files in the hierarchy (herein referred to as the folders). Such has been the state of the art for approximately forty years.

However, while providing a reasonable representation of information residing in the computer's physical storage system, a file system is nevertheless an abstraction of that physical storage system, and therefore utilization of the files requires a level of indirection (interpretation) between what the user manipulates (units having context, features, and relationships to other units) and what the operating system provides (files, folders, and directories). Consequently, users (applications and/or end-users) have no choice but to force units of information into a file system structure even when doing so is inefficient, inconsistent, or otherwise undesirable. Because most existing file systems utilize a nested folder metaphor for organizing files and folders, as the number of files increases, the effort necessary to maintain an organization scheme that is flexible and efficient becomes quite daunting.

Several unsuccessful attempts to address the shortcomings of file systems have been made in the past. Some of these previous attempts have involved the use of content addressable memory to provide a mechanism whereby data could be accessed by content rather than by physical address. However, these efforts have proven unsuccessful because, while content addressable memory has proven useful for small-scale use by devices such as caches and memory management units, large-scale use for devices such as physical storage media has not yet been possible for a variety of reasons, and thus such a solution simply does not exist. Other attempts using object-oriented database (OODB) systems have been made, but these attempts, while featuring strong database characteristics and good non-file representations, were not effective in handling file representations and could not replicate the speed, efficiency, and simplicity of the file and folder based hierarchical structure at the hardware/software interface system level.

Newly developed storage systems, such as "WinFS" (described further below) store the directory of the files as table(s) in a database. Each file is represented by a row in a base table, and file system operations, such as "enumerate all files in a directory", are satisfied using queries against the database engine. Thus, efficiently performing basic operations against the store become operations of efficiently optimizing database queries.

In such storage systems, the concept of a file is extended to that of an "object". Metadata about the file is stored in a managed CLR (common language runtime) object with a schema (defined in the storage system) to represent the allowable descriptive data for that object. For example, a picture would have a representative CLR object that would store data such as its resolution, time it was taken, and location information. This object model supports data inheritance. With data inheritance, it is possible to derive a type from another and add new fields. For example, a sub-class of the picture could be created, such as "Drivers License Picture". Such a sub-class would contain extra information, such as a Driver's License ID field.

In these newly developed storage systems, such as WinFS, the exposed schemas are mapped to tables through a translation layer. Users only see a series of views of the data instead of operating on the base tables. While the exact design of this mapping is not significant, it serves as the glue between the WinFS API and the underlying storage format. Users do not control or see this mapping directly.

The WinFS Store also exposes the concept of querying objects based on their type, as opposed to their file name as in earlier conventional file systems. Type-based queries can search for an exact type or any type that derives from a given type. This latter form is called hierarchical matching, and it is expected to be a common WinFS operation. WinFS also supports searching by file.

WinFS's schema model poses some new challenges to the query processor. User-defined types, or UDTs, are used extensively, and it is common to retrieve all UDTs from a table based on the UDT type. Furthermore, WinFS uses UDT inheritance, and it is also a requirement to retrieve all elements of a given type and also any subtype from a table. Multiple tables exist, each containing a different number of UDTs, types, type topology, and UDT distribution within that topology. Additionally, searching operations may go beyond those operations seen in traditional relational database systems to include, for example, searching of XML documents or performing searches over all fields in an object. These properties make it difficult to make accurate cardinality and cost estimates, and also make it difficult to efficiently retrieve values based on type/subtype hierarchy.

Materialized views (also referred to herein as indexed views) have been a subject of database research for over a decade. The basic idea is to materialize, or store, the result of some query, then use such computed result when similar queries are submitted to the database. For example, it may be desirable to store the result of sales per day, for example, and use the result (this materialized view) in the future to answer several related queries, such as sales in a given month or total sales in the year.

For additional flexibility, applications should not need to be aware that certain views exist, or are materialized. The query processor should identify matches between user queries and existing pre-computed results (materialized views), and use such results when applicable. This is known as the view utilization problem: Given a user query written over base tables, as well as a collection of materialized views, which materialized views can be used to answer such query? And the cost-based variant of the question: Which of those materialized views should be used?

Materialized views are similar to indices, in that they should be part of the physical design of the database and their primary purpose is to improve performance. The logical design of the database, and correctness of applications should be independent of the presence or absence of materialized views. As with indices, materialized views can introduce dramatic improvements in query performance.

Query optimizers are normally structured such that there is an initial simplification stage, followed by exploration of alternatives and cost-based selection of an execution plan, as shown in FIG. 1.

During the simplification/normalization stage 2, some changes are made on the original query Q, such as pushing selections down, or rewriting a subquery as a join, when possible. These modifications are aimed at obtaining a "better" query. Typically, there is no detailed cost estimation at this stage, and a single "better" query Q' is produced as the result.

The second stage 5 (exploration and cost-based selection) in optimization is directed to generating multiple alternatives, and using a detailed cost model to select the alternative with the cheapest estimated execution cost. Two conventional architectures for the exploration stage are bottom-up, dynamic programming join enumeration, and transformation-driven generation of alternatives. Both architectures set a table of alternatives, as is well known, which compactly encodes the various possibilities for each sub-expression of a query.

Considering materialized views during exploration comprises augmenting the table of alternatives with entries that use such materialized views. Suppose the original query is a join on tables A, B, C. The typical alternatives (with logical operators only) is given as follows:

ABC: AB⋈C, AC⋈B, BC⋈A, C⋈AB, B⋈AC, A⋈BC
AB: A⋈B, B⋈A
BC: B⋈C, C⋈B
AC: A⋈C, C⋈A

Encoded operator trees are obtained by traversing a table of the alternatives, starting from the root entry (ABC in the query above), and choosing an operator from each entry. For example, by taking the first choice in each entry, the operator tree 10 shown in FIG. 2 is obtained.

Now suppose there is a materialized view V=A⋈B. This means there is a stored table, referred to as Vt, which contains the result of the join of A and B. Because this is a valid way to obtain the join sub-expression, the alternatives is augmented with this alternative, to become:

ABC: AB⋈C, AC⋈B, BC⋈A, C⋈AB, B⋈AC, A⋈BC
AB: A⋈B, B⋈A, Vt
BC: B⋈C, C⋈B
AC: A⋈C, C⋈A

A valid operator tree 13 that can be generated and considered by the optimizer is shown in FIG. 3.

The mechanism to augment the table of alternatives depends on the optimizer architecture. In the case of a transformation-based optimizer, the extension is obtained by adding a new transformation rule to the system; for bottom-up join enumeration, the construction procedure should be changed. After the alternative is added to the table, the normal optimizer mechanisms to estimate cost, prune out expensive solutions, assemble operator trees, and construct optimal solutions are applied.

To guarantee transactional correctness, the contents of a materialized view must be kept in synch with respect to changes in base tables. For example, when orders are entered, or modified, the materialization of sales per week has to be updated to reflect the changes. This is known as the view maintenance problem. In other words, if underlying data in a base table changes, then the change must be made in the materialized view. It is desirable that the entire materialized view does not need to be re-computed to reflect such a change, because of the re-computation time and expense.

In view of the foregoing deficiencies in existing data storage and database technologies, there is a need for efficient uses of materialized views. The present invention satisfies these needs.

SUMMARY

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

The present invention is directed to the use of a materialized view (also referred to herein as an indexed view) as a secondary index on a base table with potentially multi-valued attributes. This provides for using the index to search in the result of a function application over data. Moreover, the present invention provides for indexing on the result of a table-valued function invocation. Indexing a view on the result of such a function invocation provides the ability to index the contents of complex structures.

An exemplary unnesting operation is "cross apply unnest". In this example, UNNEST is a function that takes a UDT collection as a complex structure and outputs rows for each element in the collection. Other function examples could transform XML data into a more searchable form or decompose multiple columns into a single indexing structure for specialized searching. This invention provides additional options for a query execution plan, leading to a more optimized query.

According to further aspects of the invention, a back-join is provided from the indexed view to the base table. This allows fields from the base table that are not present in the indexed view to be included in a result of a query on the table which is processed using the indexed view as an access path. This provides a means of including columns in the query result that are not in the indexed view but are in the base table. The back-join is supported from a single-table indexed view to the base table via a unique clustering key which acts as a logical row locator. Thus, the system can back-join to the base table from an indexed view via the unique clustering key. These features allow the use of indexed views to index a table on the contents of a complex function invocation and to efficiently retrieve data from rows that match criteria over this function invocation.

Other features and advantages of the invention may become apparent from the following detailed description of the invention and accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

WinFS is a file system/data store that introduces the concepts of objects in the file system. One of the operations in this store is to be able to efficiently locate and query objects. The present invention describes how aspects of this operation can be made very efficient.

Exemplary Computing Environment

As used herein and in the claims, the following terms have the following meanings:

An "object" is a unit of storable information accessible to a hardware/software interface system that has a basic set of properties that are commonly supported across all objects exposed to an end-user by the hardware/software interface system shell. Objects also have properties and relationships that are commonly supported across all types including features that allow new properties and relationships to be introduced.

An "operating system" (OS) is a special program that acts as an intermediary between application programs and computer hardware. An operating system comprises, in most cases, a shell and a kernel.

A "hardware/software interface system" is software, or a combination of hardware and software, that serves as the interface between the underlying hardware components of a computer system and applications that execute on the computer system. A hardware/software interface system typically comprises (and, in some embodiments, may solely consist of) an operating system. A hardware/software interface system may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/software interface system is to provide an environment in which a user can execute application programs. The goal of any hardware/software interface system is to make the computer system convenient to use, as well as utilize the computer hardware in an efficient manner.

Figure 1:
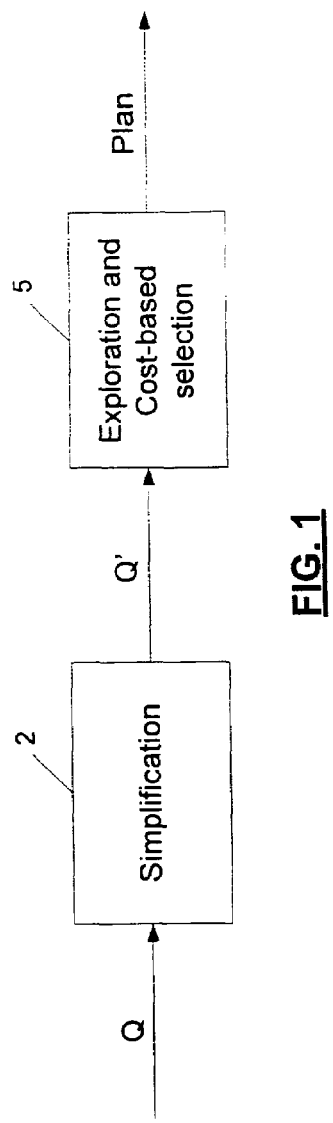
FIG. 1 is a block diagram of a conventional query optimizer.
Figure 2:
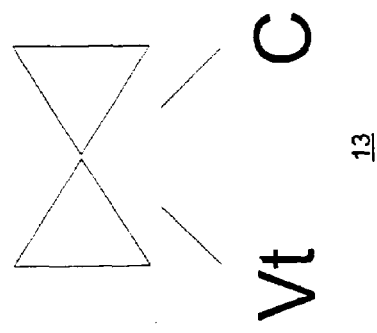
FIG. 2 is a diagram of an exemplary operator tree.
Figure 3:
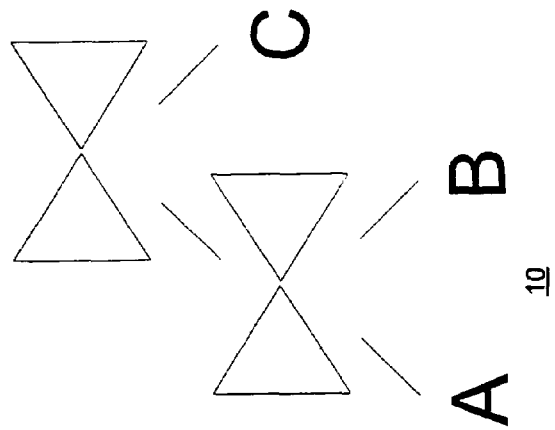
FIG. 3 is a diagram of the operator tree of FIG. 2 incorporating a materialized view.
Figure 4:
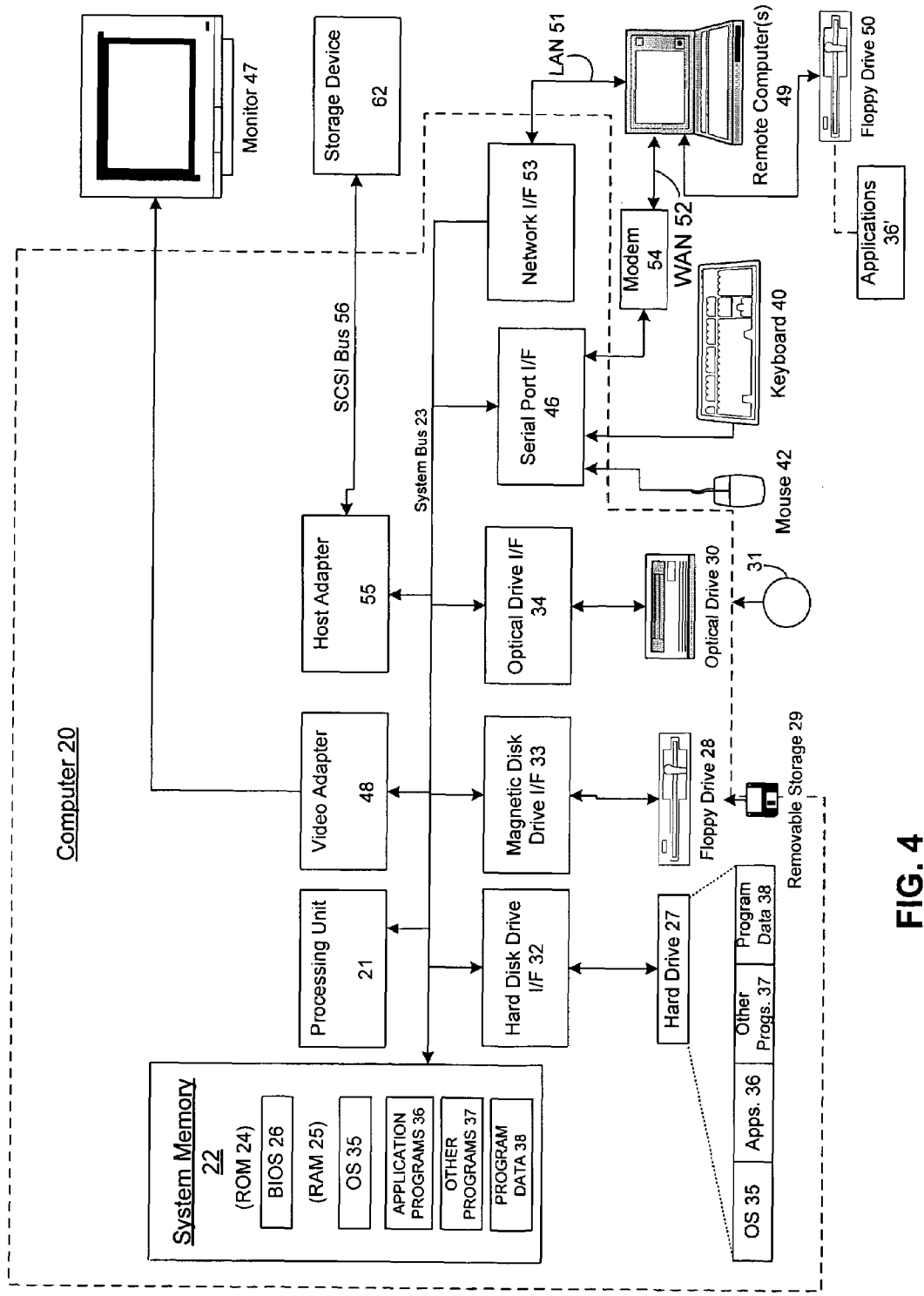
FIG. 4 is a block diagram representing a computer system in which aspects of the present invention may be incorporated.

Numerous embodiments of the present invention may execute on a computer. FIG. 4 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 4, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 4 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 4. The logical connections depicted in FIG. 4 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

Figure 5:
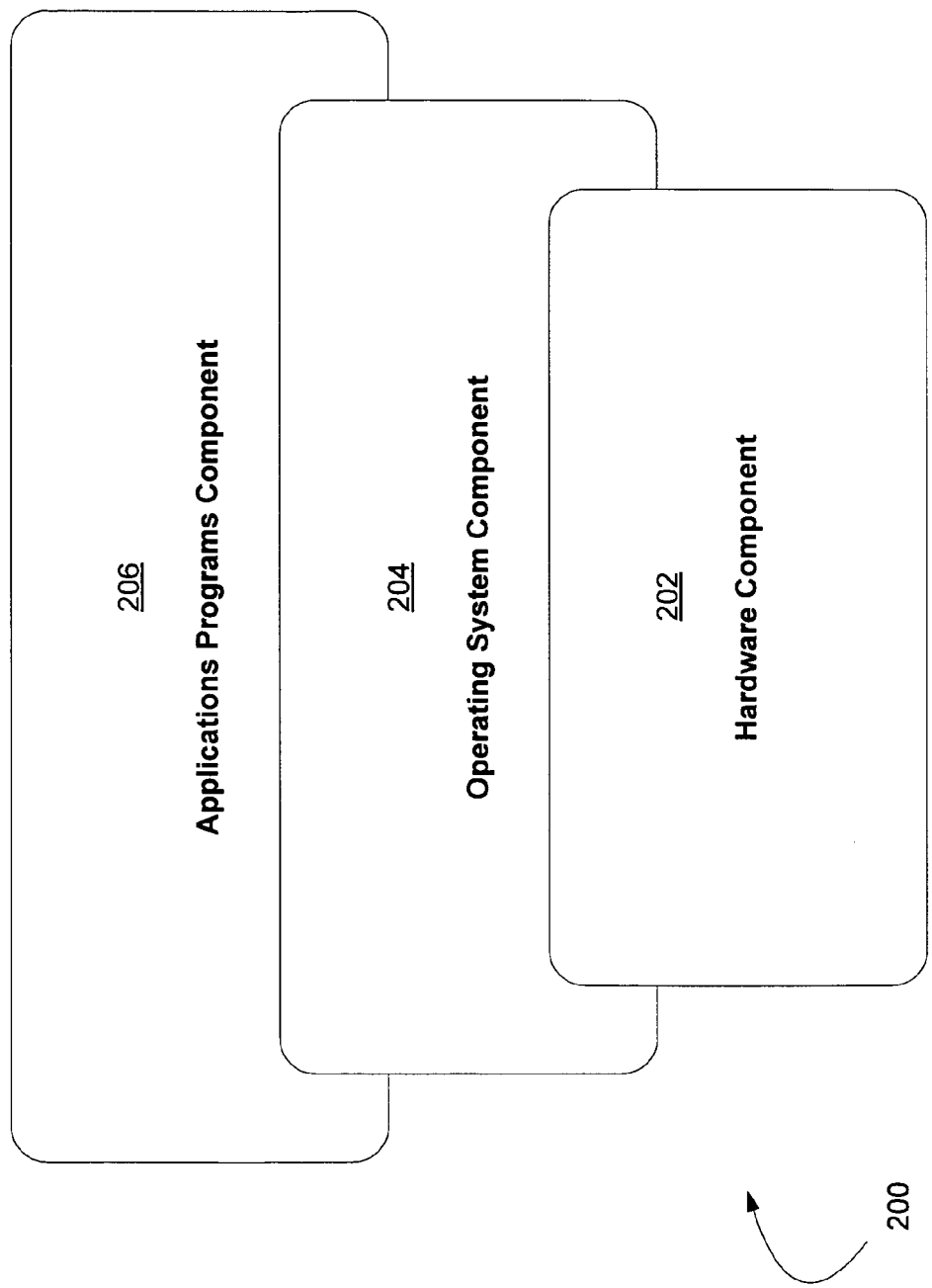
FIG. 5 is a block diagram illustrating a computer system divided into three component groups: the hardware component, the operating system component, and the applications programs component.

As illustrated in the block diagram of FIG. 5, a computer system 200 can be roughly divided into three component groups: the hardware component 202, the operating system component 204, and the applications programs component 206.

In certain computer systems 200, and referring back to FIG. 4, the hardware 202 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 202 comprises the basic resources for the computer system 200.

The applications programs component 206 comprises various software programs including but not limited to compilers, database systems, word processors, business programs, videogames, and so forth. Application programs provide the means by which computer resources are utilized to solve problems, provide solutions, and process data for various users (e.g., machines, other computer systems, and/or end-users).

The operating system component 204 comprises the operating system itself and its shell and kernel. An operating system (OS) is a special program that acts as an intermediary between application programs and computer hardware, and the purpose of an operating system is to provide an environment in which a user can execute application programs. The goal of any operating system is to make the computer system convenient to use, as well as utilize the computer hardware in an efficient manner.

The operating system is generally loaded into a computer system at startup and thereafter manages all of the application programs (or simply "applications") in the computer system. The application programs interact with the operating system by requesting services via an application program interface (API). Some application programs enable end-users to interact with the operating system via a user interface such as a command language or a graphical user interface (GUI).

An operating system traditionally performs a variety of services for applications. In a multitasking operating system where multiple programs may be running at the same time, the operating system determines which applications should run in what order and how much time should be allowed for each application before switching to another application for a turn. The operating system also manages the sharing of internal memory among multiple applications, and handles input and output to and from attached hardware devices such as hard disks, printers, and dial-up ports. The operating system also sends messages to each application (and, in certain cases, to the end-user) regarding the status of operations and any errors that may have occurred. The operating system can also offload the management of batch jobs (e.g., printing) so that the initiating application is freed from this work and can resume other processing and/or operations. On computers that can provide parallel processing, an operating system also manages dividing a program so that it runs on more than one processor at a time.

An operating system's shell is the interactive end-user interface to an operating system (and is also known as the "command interpreter"). A shell is the outer layer of an operating system that is directly accessible by application programs and even directly by end-users. In contrast to a shell, the kernel is an operating system's innermost layer that interacts directly with the hardware components.

As well understood by those of skill in the relevant art, "files" are entities of information (including but not limited to the operating system itself, as well as application programs, data sets, and so forth) that are capable of being manipulated as discrete (storable and retrievable) entities by an operating system. In modern operating systems (Windows, Unix, Linux, Mac OS, and so forth), files are the basic units of storable information (e.g., data, programs, and so forth) that are manipulated by the operating system, and groups of files are organized in "folders." In Microsoft Windows, Macintosh, and other operating systems, a folder is a collection of files that can be retrieved, moved, and otherwise manipulated as one entity. In certain other operating systems, such as DOS, z/OS and most Unix-based operating systems, the term "directory" is used rather than folder, and early Apple computer systems (for example, the Apple IIe) used the term "catalog"; however, as used herein, all of these terms are synonymous and interchangeable, and are intended herein to further include all other equivalent terms for and references to hierarchical information storage structures.

Figure 6:
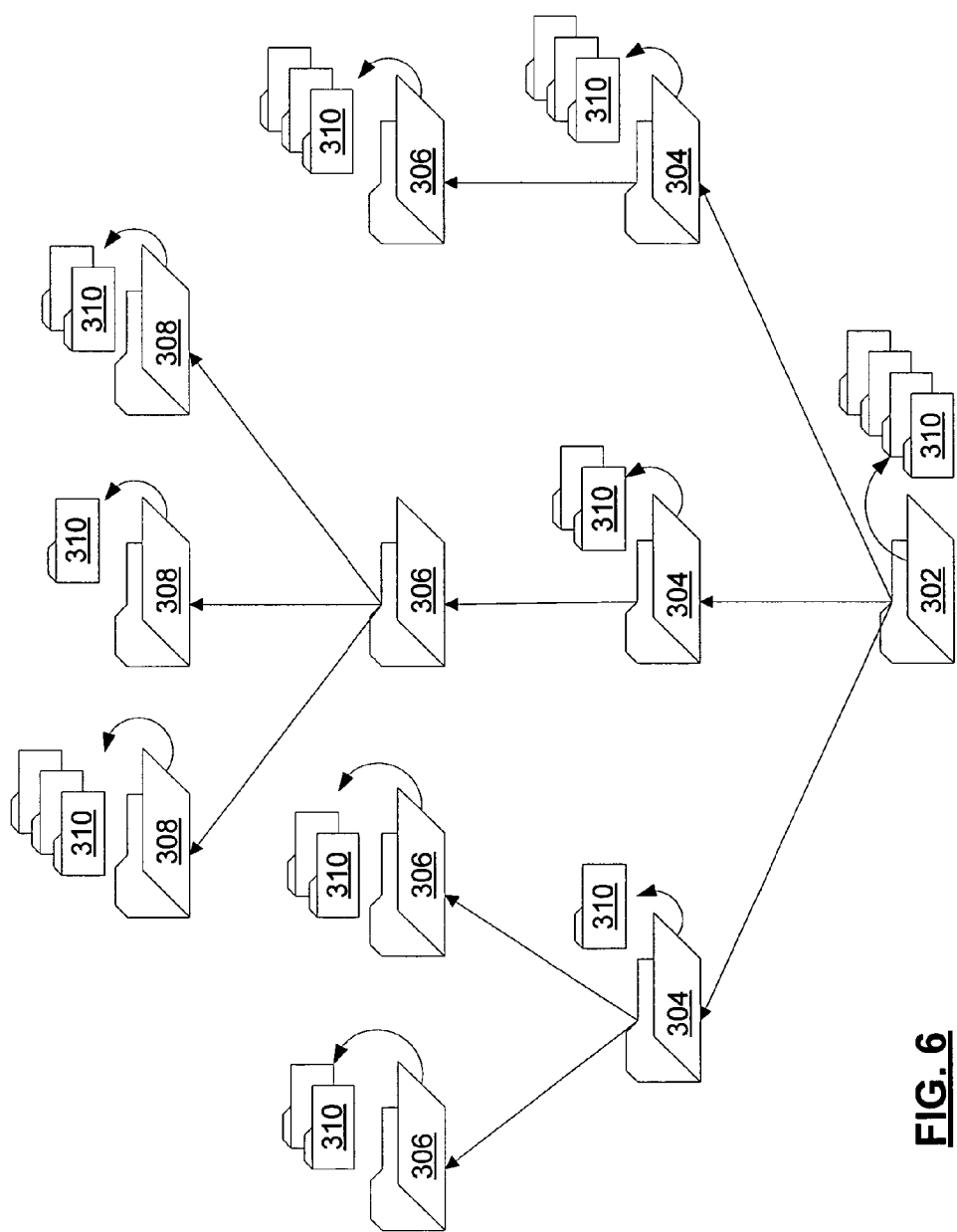
FIG. 6 illustrates a tree-based hierarchical structure for files grouped in folders.

As known and understood by those of skill in the art, a directory (that is, a directory of folders) is a tree-based hierarchical structure wherein files are grouped based on location in the folders which comprise the nodes of the tree structure. For example, as illustrated in FIG. 6, a DOS-based file system base folder (or "root directory") 302 may comprise a plurality of folders 304, each of which may further comprise additional folders (as "subfolders" of that particular folder) 306, and each of these may also comprise additional folders 308 ad infinitum. Each of these folders may have one or more files 310 although, at the operating system level, the individual files in a folder have nothing in common other than their location in the tree hierarchy. Not surprisingly, this approach of organizing files into folder hierarchies indirectly reflects the physical organization of typical storage media used to store these files (e.g., hard disks, floppy disks, CD-ROMs, etc.).

In addition to the foregoing, each folder is a container for its subfolders and its files-that is, the folder owns these subfolders and files. For example, when a folder is deleted by the operating system, its subfolders and files are also deleted (which, in the case of each subfolder, includes its own subfolders and files recursively). Likewise, each file can only be owned by one folder and, although a file can be copied and the copy located in a different folder, a copy of a file is itself a distinct and separate entity that has no direct connection to the original (e.g., changes to the original file are not mirrored in the copy file at the operating system level). In this regard, files and folders are therefore characteristically "physical" in nature because folders are the conceptual equivalents of physical containers, and files are the conceptual equivalents to discrete and separate physical elements inside containers.

Figure 7:
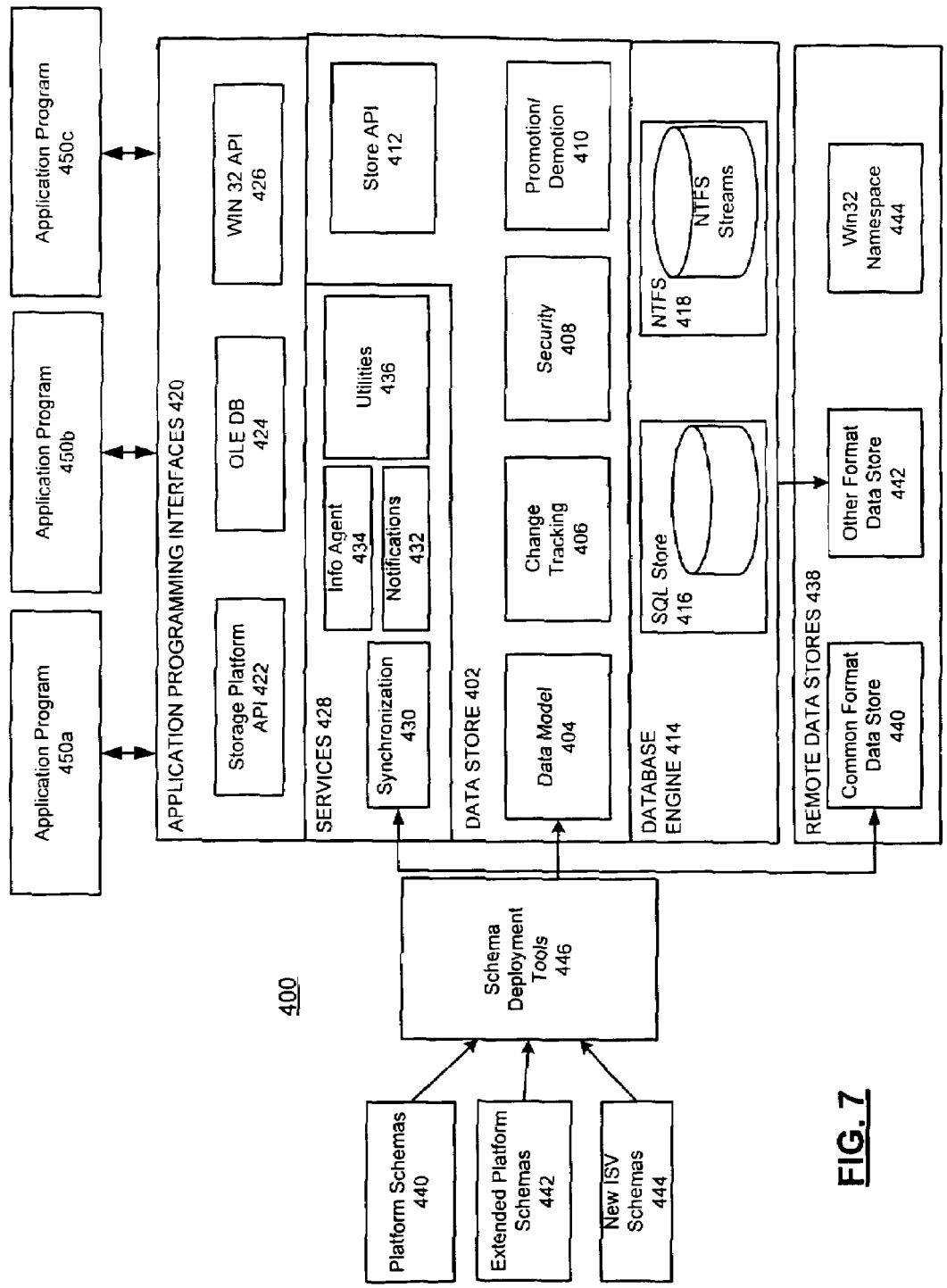
FIG. 7 illustrates an exemplary storage platform that can be used with the present invention.

A storage platform for organizing, searching, and sharing data that can be used with the present invention is designed to be the store for all types of data, including a form of data called objects. Referring to FIG. 7, a storage platform 400 in accordance with the present invention comprises a data store 402 implemented on a database engine 414. In one embodiment, the database engine comprises a relational database engine with object relational extensions. In one embodiment, the relational database engine 414 comprises the Microsoft SQL Server relational database engine.

The data store 402 implements a data model 404 that supports the organization, searching, sharing, synchronization, and security of data. Specific types of data are described in schemas, such as schemas 440, and the storage platform 400 provides tools 446 for deploying those schemas as well as for extending those schemas.

A change tracking mechanism 406 implemented within the data store 402 provides the ability to track changes to the data store. The data store 402 also provides security capabilities 408 and a promotion/demotion capability 410. The data store 402 also provides a set of application programming interfaces 412 to expose the capabilities of the data store 402 to other storage platform components and application programs (e.g., application programs 450a, 450b, and 450c) that utilize the storage platform.

The storage platform of the present invention still further comprises an application programming interface (API) 422, which enables application programs, such as application programs 450a, 450b, and 450c, to access all of the foregoing capabilities of the storage platform and to access the data described in the schemas. The storage platform API 422 may be used by application programs in combination with other APIs, such as the OLE DB API 424 and the Microsoft Windows Win32 API 426.

The storage platform 400 of the present invention may provide a variety of services 428 to application programs, including a synchronization service 430 that facilitates the sharing of data among users or systems. For example, the synchronization service 430 may enable interoperability with other data stores 440 having the same format as data store 402, as well as access to data stores 442 having other formats. The storage platform 400 also provides file system capabilities that allow interoperability of the data store 402 with existing file systems, such as the Windows NTFS files system 418.

In at least some embodiments, the storage platform 420 may also provide application programs with additional capabilities for enabling data to be acted upon and for enabling interaction with other systems. These capabilities may be embodied in the form of additional services 428, such as an Info Agent service 434 and a notification service 432, as well as in the form of other utilities 436.

In at least some embodiments, the storage platform is embodied in, or forms an integral part of, the hardware/software interface system of a computer system. For example, and without limitation, the storage platform of the present invention may be embodied in, or form an integral part of, an operating system, a virtual machine manager (VMM), a Common Language Runtime (CLR) or its functional equivalent, or a Java Virtual Machine (JVM) or its functional equivalent.

Through its common storage foundation, and schematized data, the storage platform of the present invention enables more efficient application development for consumers, knowledge workers, and enterprises. It offers a rich and extensible programming surface area that not only makes available the capabilities inherent in its data model, but also embraces and extends the existing file system and database access methods.

In the description herein, and in various ones of the figures, the storage platform 400 of the present invention may be referred to as "WinFS." However, use of this name to refer to the storage platform is solely for convenience of description and is not intended to be limiting in any way.

The data store 402 of the storage platform 400 of the present invention implements a data model that supports the organization, searching, sharing, synchronization, and security of data that resides in the store. In the data model of the present invention, an "object" is the fundamental unit of storage information. The data model provides a mechanism for declaring objects and object extensions and for establishing relationships between objects and for organizing and categorizing objects.

The relational database engine 414, which in one embodiment comprises the Microsoft SQL Server engine, supports built-in scalar types. Built-in scalar types are "native" and "simple". They are native in the sense that the user cannot define their own types and they are simple in that they cannot encapsulate a complex structure. User-defined types ("UDTs") provide a mechanism for type extensibility above and beyond the native scalar type system by enabling users to extend the type system by defining complex, structured types. Once defined by a user, a UDT can be used anywhere in the type system that a built-in scalar type might be used.

The storage platform schemas are mapped to UDT classes in the database engine store. Data store objects are mapped to UDT classes deriving from the Base.Item type. Extensions are also mapped to UDT classes and make use of inheritance. The root Extension type is Base.Extension, from which all Extension types are derived.

A UDT is a CLR class—it has state (i.e., data fields) and behavior (i.e., routines). UDTs are defined using any of the managed languages—C#, VB.NET, etc. UDT methods and operators can be invoked in T-SQL against an instance of that type. A UDT can be the type of a column in a row, the type of a parameter of a routine in T-SQL, or the type of a variable in T-SQL, for example.

Exemplary Embodiments

The present invention provides for creation of an indexed view (i.e., a materialized view) on a table known as a base table (because it is the base on which the view is defined) and uses this indexed view in additional operations and structures that may be used to enhance querying. The indexed view serves as an index on the base table. This index can be used as an access path to the base table to solve queries that match the structure of the indexed view and the base table.

Figure 8:
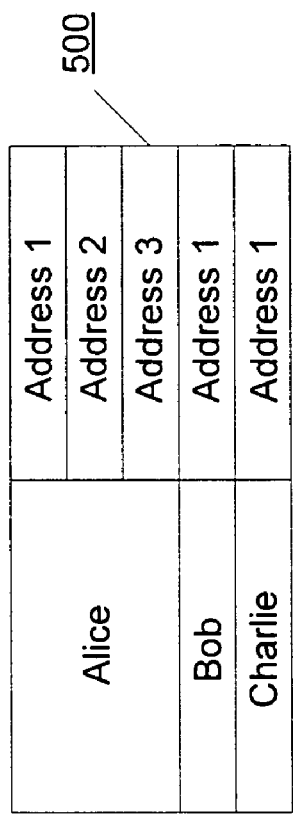
FIG. 8 is a diagram of an exemplary indexed view in accordance with the present invention.

A typical indexed view contains data entries and could contain associated sub-entries or other dependent or derived data. An indexed view might contain the results of a function invocation that transforms the data. As an example, the indexed view may contain nesting, in which case one entry has multiple associated sub-entries. For example, assume a first base table contains names and a second base table contains addresses. A "join" operation on the two base tables provides the addresses for a particular name. An indexed view might be stored that contains names and associated addresses, such as the indexed view 500 shown in FIG. 8. In the indexed view 500, the name "Alice" has three associated addresses: address 1, address 2, and address 3. Other names (e.g., "Bob" and "Charlie") in the example indexed view 500 each have one associated address. The indexed view is considered to be nested because of the multiple addresses associated with the name "Alice". It is desirable to remove this nesting, so that if one of the addresses associated with Alice changes, the address can be directly accessed, and the indexed view will not have to be re-computed to reflect the change. The results of other functions could also be indexed in this manner.

Figure 9:
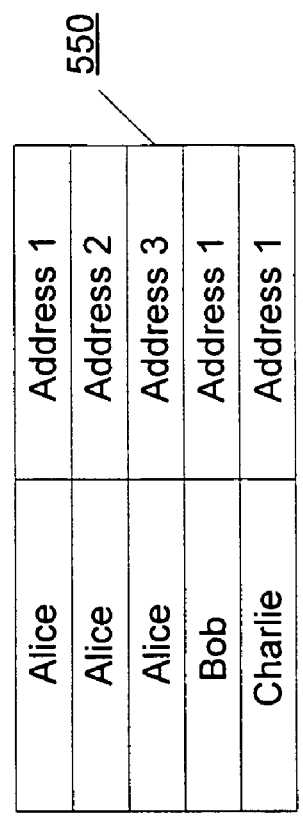
FIG. 9 is a diagram of an exemplary clustering key in accordance with the present invention.

To remove this nesting, a unique clustering key 550 is constructed, as shown in FIG. 9. As shown and described in further detail below, the key 550 provides a separate sub-entry for each entry having nesting in the indexed view. Thus, the key 550 in this example provides three entries "Alice", each associated with a different one of the addresses: address 1, address 2, and address 3. This key allows an application to go back and forth between the base table and the indexed view.

An indexed view can be treated as a secondary index on a base table with multi-valued attributes. Thus, the present invention provides for using the indexed view to search in the results of the function invocation (such as the nested data in this example). Indexing is performed on the result of a function invocation (such as an unnest operation). In other words, the derived data (i.e., the sub-entries) is indexed. The present invention indexes complex structures, so that more indexed views can be determined and available for use. This provides more options for a query execution plan, leading to a more optimized query.

As described further below, indexing a view on the result of a function invocation operation provides a method of indexing complex transformations of the data (such as the contents of a nested collection). An exemplary unnesting operation supported by the present invention is SQL Server's "cross apply unnest". In particular, on "cross apply unnest" operations, one level of nesting in an indexed view can be unnested. However, it is contemplated that any number of levels of unnesting could be used in accordance with the present invention. More generally, it is contemplated that multiple levels of function invocation could be indexed in this manner.

Moreover, a "back-join" is provided from the indexed view to the base table. This allows fields from the base table that are not present in the indexed view to be included in a result of a query on the table which is processed, using the indexed view as an access path. Back-joins are used from indexed views to the base table on which the view is defined. This provides a means of including columns in the query result that are not in the indexed view but are in the base table.

A back-join is desirably supported from a single-table indexed view to the base table via a unique clustering key which acts as a logical row locator. The system can back-join to the base table from an indexed view via the unique clustering key. These features allow the use of indexed views to index a table on the contents of the results of a functional invocation over data, such as the "cross apply unnest" operations over multi-set or multi-valued attributes.

As noted above, an indexed view can be defined on the result of a functional invocation over data (such as the cross apply unnest operation). In combination with back-join capability, this allows access of records in a table based on the contents of collections of values contained in those records. Thus, an index on a multi-set attribute of a UDT can be created using an indexed view. For example, the following indexed view can help speed up performance of retrieval on city:

Create view iv_city with schemabinding as
Select a.addr.city city, a.addr.addrID addrID, person.htid, person.pid
From person cross apply unnest (pcol.addresses) a(addr)
Create unique clustered index iv_city_idx on iv_city(city, pid, addrID)

It is noted that addrID and pid are desirably used to make the index unique, and it is assumed that addrID is unique within a single multi-set of addresses. The following example demonstrates how general function invocations would be possible with this indexing capability:

Create view iv_city with schemabinding as
Select a.addr.city city, a.addr.addrID addrID, person.htid, person.pid
From person cross apply FUNCTION (pcol) a(addr)
Create unique clustered index iv_city_idx on iv_city(city, pid, addrID)

In this example, "unnest" has been replaced with "FUNCTION" that represents the "functional invocation over data" discussed in herein. In general, different functions could be used in place of "FUNCTION". Possible examples include unnesting data in a collection, decomposing XML documents, or indexing multiple fields from a complex structure (such as a UDT). It is possible to use this mechanism for other functions over data as well.

The indexed view for the query can be used to answer the query without reading the base table (e.g., the base table "person"). This may be beneficial because the index may be much smaller than the base table. For example, the base table "person" desirably comprises an attribute pcol which is a UDT. One of the fields of pcol (addresses) is a multi-set (a collection-valued attribute). Consider Table 1, which is a hypothetical "person" table.

TABLE 1

| Person | Pid | Htid | Pcol |  |  |  |
|--------|-----|------|------|------|------|------|
|        |     |      | Pid | Name ... | Addresses | |
|        | 1   | N/A  | 1   | Bob  | AddrID | City ... |
|        |     |      |     |      | 1 | Bellevue |
|        |     |      |     |      | 2 | Corvallis |
|        | 2   | N/A  | 2   | Sue  | AddrID | City |
|        |     |      |     |      | 3 | Bellevue |
|        |     |      |     |      | 4 | Berkeley |

Table 1 shows the finest level of granularity. Columns not essential to the example have been omitted and are shown by ellipses. Notice that pid and name are atomic attributes, and thus contain only one value, while addresses is a collection, and thus contains more than one value in this example. City is a field of each member of addresses.

In the "person" table, a plurality of sub-rows is shown for each name. For example, Bob has two addresses sub-rows: AddrID 3 and 4, corresponding to Bellevue and Corvallis, respectively; and Sue has two address sub-rows: AddrID 3 and 4, corresponding to Bellevue and Berkeley, respectively.

Consider the indexed view iv_city. For the above value of the "person" table, the contents of iv_city would be as shown in Table 2.

TABLE 2

| iv_city | City | AddrID | Htid | Pid |
|---------|------|--------|------|-----|
|         | Bellevue | 1 | 1 | 1 |
|         | Bellevue | 3 | 1 | 2 |
|         | Berkeley | 4 | 1 | 2 |
|         | Corvallis | 2 | 1 | 1 |

Each row in iv_city corresponds to the information in the finest level of granularity data. Thus, the indexed view shows each sub-row entry is now in its own row. Note that the Pid can be used as a back-join back to the first table. For example, Pid 1 in iv_city will back-join to Pid 1 in the "person" table. It is possible to index partial data (i.e., only data that is of interest, e.g., only people who live in Bellevue).

Now, consider the following query to find the names of all people with at least one address in Corvallis:

Select distinct person.pid, person.pcol.name
From person cross apply unnest (Pcol.addresses) as a(addr)
Where a.addr.city='Corvallis'

Figure 10:
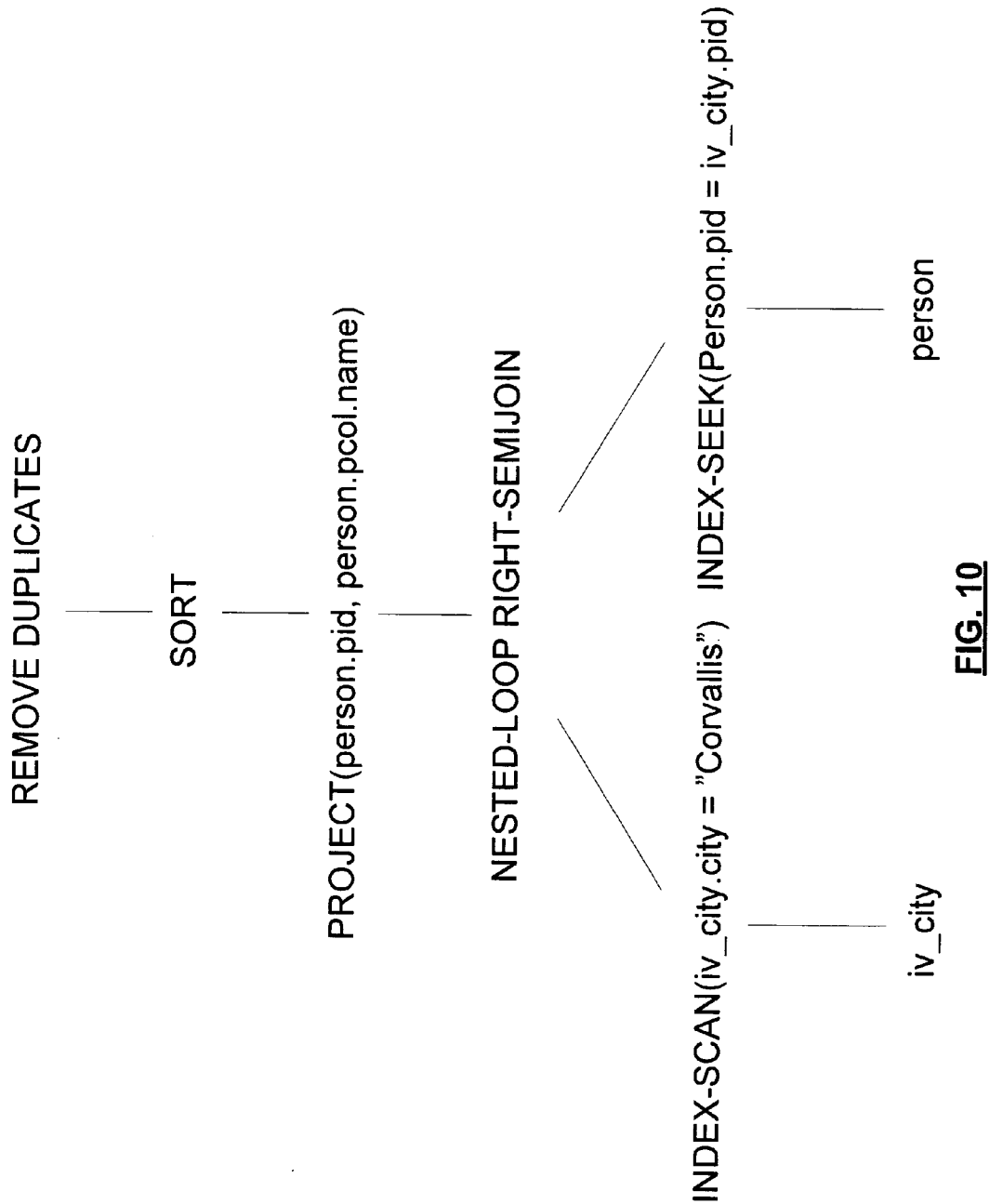
FIG. 10 shows an exemplary execution plan in accordance with the present invention.

The execution plan shown in FIG. 10 can answer the above query by using both iv_city (an indexed view on an unnest result) and a back-join to the base table "person" on the key of person, pid.

Note that the cross apply unnest indexed view iv_city, in combination with a back-join operation (as shown in FIG. 10), enables a fast associative lookup of "person" table rows based on the city contained within individual address values in the addresses collection of a pcol UDT field value of person.

For the example data given, the index scan on the left will identify just one row of iv_city (the last one in Table 2 above illustrating iv_city's contents). This row of iv_city joins with the row of person for Bob. Bob's "person" table row will then pass the above semi-join operator. In FIG. 10, the "nest-loop right semi-join" operation acts as the back-join operation. Then the pid and pcol.name fields will be projected, again resulting in one row. There are no duplicates, so sorting and duplicate elimination do not change their input streams. The final result is shown in Table 3.

TABLE 3

| Pid | Name |
|-----|------|
| 1   | Bob  |

More particularly, with respect to back-joins from an indexed view, suppose an indexed view V is a function of N base tables, T1 . . . TN. Furthermore, assume that V is constructed only using select, project, join, group-by, and aggregation operations. Each table T1 . . . TN has one or more keys identified in metadata for the table. A key is a set of one or more columns of the table such that the values in the set uniquely identify a row in the table.

Suppose that the set of rows matching a query Q defined against T1 . . . TN can be identified using only the rows in V. (Q could be a portion of a larger query. Without loss of generality, consider Q as a free-standing query.) Even though the rows of the result of Q can be identified by consulting V, this does not mean that the rows resulting from Q can be constructed entirely from V. It may be the case that some columns that desirably should appear in the result of Q only appear in one of T1 . . . TN.

A back-join from indexed view V to a base table T on which the view is defined (one of T1 . . . TN) is defined as an equi-join between V and T on any key of T, and the field(s) in V drawn from that key of T. The key on which a back-join is performed may be, but is not limited to, a single or multi-column primary key, or a single or multi-column candidate key. The key may or may not have an index. If the key does have an index, the index may or may not be clustered. Although back-joins are described herein as being performed on the clustering key of the base table, the invention encompasses the ability to do back-joins on any type of key.

As an example of a back-join, consider a table defined using the following SQL statement:
   Create table emp(eno int, name varchar(30), salary money)

Define that base table "emp" will be stored using a clustered access path ordered on eno, as follows:
   Create unique clustered index eno_idx on emp(eno)

Eno is a key of emp. Now, consider an indexed view defined as follows:
   Create view highpaid with schemabinding as
   Select eno, salary
   From dbo,emp e
   Where salary>200000.00
   Create unique clustered index on highpaid(eno)

Now, consider the following query:
   Select eno, name, salary from emp where salary>300000.00

Figure 11:
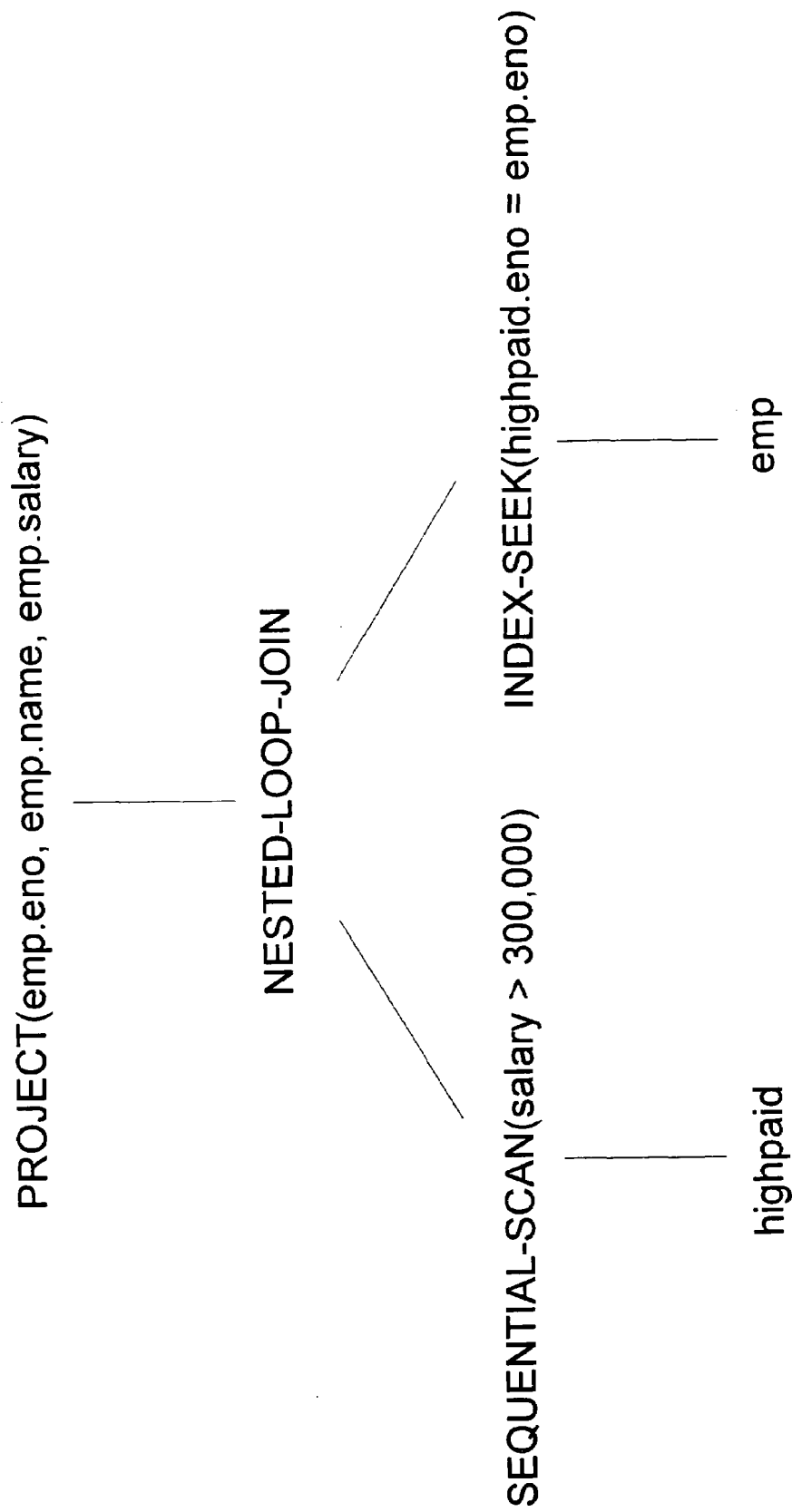
FIG. 11 shows an exemplary access plan in accordance with the present invention.

As an example of how to use indexed view "highpaid" with a back-join to solve this query, an access plan as shown in FIG. 11 will provide an exemplary answer to the query. As shown in FIG. 11, the rows selected from the indexed view "highpaid" are "joined-back" to the base table "emp" on the key eno using the "nested-loop-join" operation as the back-join operation. Hence the term "back-join" is used to describe a join from an indexed view back to a base table on a key.

It is contemplated that any type of join algorithm can be used with a back-join (e.g., nested-loop, sort-merge, hash).

Figure 12:
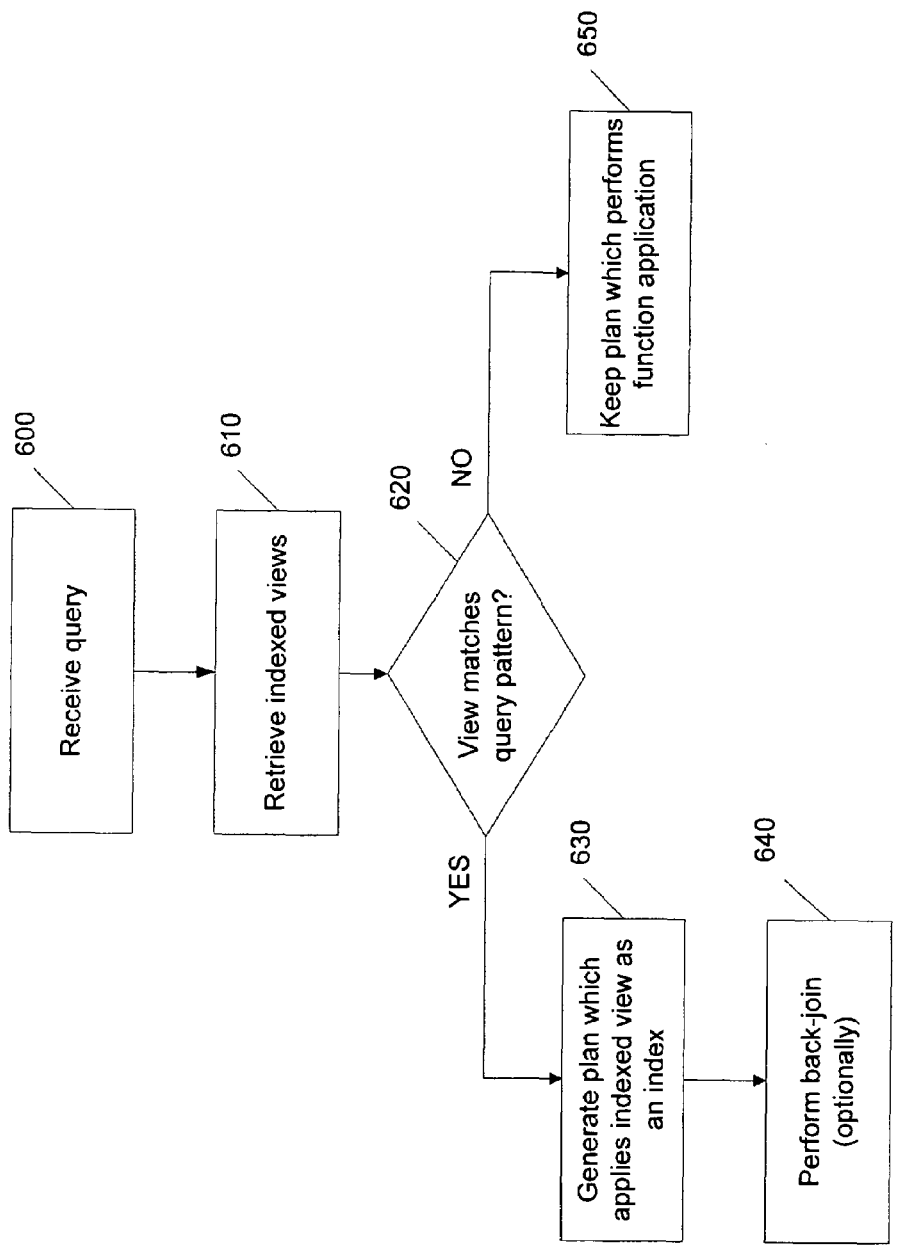
FIG. 12 is a flow diagram of an exemplary method of querying data in accordance with the present invention.

FIG. 12 is a flow diagram of an exemplary method of querying data in a base table having nested data. At step 600, a query is received. An indexed view for the data in the base table is received, retrieved, or otherwise generated, at step 610. The query optimizer determines whether the query matches or contains a query pattern which matches an indexed view, at step 620. If the query or parts of it match an indexed view, the query optimizer generates a plan which uses the matching indexed view as an index instead of performing the function application, at step 630. If the indexed view cannot deliver all columns requested in the original query, the optimizer introduces a back-join with the original base table to acquire the missing columns via the clustering key, at step 640. This allows fields from the base table that are absent in the indexed view to be included in the query result.

If the query or parts of the query do not match any indexed view, the query optimizer generates a plan which applies the original function over data, at step 650.

The present invention also allows for indexed views as a generalization of partial indexes, as well as indexed views as partial indexes over a type hierarchy. By combining indexed views with the ability to back-join from the indexed view to the base table, the invention provides a generalization to the technique known as the partial index. Indexed views plus back-join capability provide a more powerful set of capabilities than partial indexes.

To create an index of only a subset of rows in a table, an appropriate condition is provided in the indexed view definition (e.g., in the Where clause). For example, to create a view to accelerate lookups of Person "Fred", the following indexed view is defined:
   Create View v_fred with schemabinding as
   Select pid, htid
   From person
   Where pcol.name='Fred'
   Create unique clustered index i_V_fred on v_fred(htid, pid)

Given the capability to do back-joins on the clustering key of the base table, and the existing query matching capabilities for indexed views, this indexed view can help answer queries such as "Select * from person where pcol.name='Fred'". This query could be solved by reading the one row in the indexed view and joining it back to the person table.

Furthermore, indexed views plus the capability of back-joins to the base table also can support indexing a set of user-defined types (also known as UDTs, or objects) in an object-relational DBMS (database management system). If the types are arranged in a generalization hierarchy (also known as type hierarchy or IS-A hierarchy), then it is possible to use an indexed view plus back-join capability to index values in a table whose type is of a given type or one of its subtypes.

To index on fields of a subtype in which a partial index filtered on type is not needed or desired, a conventional index on a computed column can be implemented. Values of the computed column desirably will be NULL for types that do not have the field being indexed. The index may be clustered or unclustered. For example, to create a clustered index on a person's salary, in which the salary field of non-employees will be NULL:
   Alter table person add salary as (treat pcol as employee_t).salary
   Create clustered index i_sal on person (salary)

To index a subset of the type hierarchy for a given UDT column (e.g., because only values in that subset have a specific attribute that is desired to be indexed), then create a partial index using the IS OF predicate in the Where clause of the view definition. For example, to create an index over employee salary that does not include records in the index for persons who are not employees:
   Create view v-emp_sal2 with schemabinding as
   Select (treat pcol as employee_t).salary salary, htid, pid
   From person
   Where pcol is of (employee_t)
   Create unique clustered index i_emp_sal2 on v_emp_sal2 (salary, htid, pid)

This exemplary indexed view does not have NULL entries for non-employee salaries. Non-employees are not indexed because they are preferably filtered out by the IS OF condition in the Where clause of the view.

Indexing of XML Fields

Aspects of the present invention can be used to index XML valued data fields. In contrast to relational data, stored in tables of the database, XML is semi-structured: the data does not adhere to an a priori declared schema but is annotated with tags which express schema information. In order to index and process XML data in a conventional database system, it has to be broken down into a table format. The following example shows an XML fragment and one possible corresponding table format shown in Table 4.

```
<person>
    <name>Jim Smith</name>
    <phones>
        <home>425-601-9229</home>
        <cell>425-799-1532</cell>
    </phones>
    ...
</person>
```

TABLE 4

| TAG | VALUE | HIERARCHICAL INFORMATION |
|---|---|---|
| Person |  | 1 |
| name | Jim Smith | 1.1 |
| phones |  | 1.2 |
| home | 425-601-9229 | 1.2.1 |
| cell | 425-799-1532 | 1.2.2 |

Various different ways to break down XML into a table format are possible and the present invention is not limited to using a particular one. Rather, any function, referred to as XML Transform herein for example, which given an XML fragment outputs a table-valued format can be used.

The function XMLTransform is a table-valued function as described above. The present invention allows indexing the result of an invocation of XMLTransform over an XML fragment. For example, users may want to build indexes on the TAG, VALUE, and HIERARCHICAL INFORMATION columns or combinations thereof.

One possible way users can query an XML fragment could be written as follows:

Select Value
From '<xml . . . >' xmlstring cross apply XMLTransform (xmlstring)
Where Tag='name' and Value='sam Jones' where '<xml . . . >' stands for any given XML fragment. A query would search the XML fragment for elements tagged 'name' with value 'sam Jones'.

In addition, the XML fragment may be supplied in the form of an XML datatype field in a database table instead of being given as an XML text string. An example for a query using XML from an XML datatype column could be written as:

Select Value
From sales cross apply XMLTransform(sales.salesperson)
Where (Tag='cell' or Tag='home') and Value like '425%'
And sales.date='Feb. 28, 2004'

This assumes there is a column salesperson in table sales which is of type XML fragment, i.e., every row in sales contains an XML Fragment which can be referred to as salesperson. The above query combines querying the sales table with querying the XML fragment; it returns the phone numbers of sales people who closed a deal on Feb. 28, 2004.

Multiple Column or Field Transformations

Another exemplary embodiment allows the indexing of multiple columns and/or multiple fields of a complex structure. Typically, indexing structures in database systems can index data from a single column or location in a complex structure. For example, the example described with respect to Table 2 described a mechanism to index Address fields in a nested collection. Aspects of the present invention also can be used to index data derived from multiple fields within a complex object or within a row.

TABLE 5

| tbl_peopleaddresses | City | State | ID | Name |
|---|---|---|---|---|
|  | Bellevue | WA | 1 | George |
|  | West Lake | WA | 2 | Sara |
|  | Berkeley | CA | 3 | Bob |
|  | Corvallis | OR | 4 | Jeff |

The example indexed view in Table 5 describes a table of people and where they live. A functional invocation over the data could return the data shown in Table 6.

TABLE 6

| iv_peopleaddresses | City | ID | (additional column(s)) |
|---|---|---|---|
|  | Bellevue | 1 | ... |
|  | West Lake | 2 | ... |
|  | Berkeley | 3 | ... |
|  | Corvallis | 4 | ... |
|  | WA | 1 | ... |
|  | WA | 2 | ... |
|  | Washington | 1 | ... |
|  | Washington | 2 | ... |
|  | CA | 3 | ... |
|  | California | 3 | ... |
|  | OR | 4 | ... |
|  | Oregon | 4 | ... |
|  | George | 1 | ... |
|  | Sara | 2 | ... |
|  | Bob | 3 | ... |
|  | Jeff | 4 | ... |
|  | West | 2 | ... |
|  | Lake | 2 | ... |

Table 6 describes the result of a different kind of indexed view over the data from Table 5. In this example, multiple columns from Table 5 are indexed together in the indexed view. While this example uses multiple columns, it is also possible to use multiple fields from a complex object such as a UDT or a combination of both. Furthermore, this transformation can contain special logic applied to columns or fields in the data. In this example, the abbreviations for each state are part of the target transformation and the original source data. However, the full names of each state are generated as part of the functional invocation and also inserted into the result. Many transformations are possible and are not limited to introducing additional mappings for a single value. Possible mappings could include, but are not limited to, taking sub-strings of the data in a column, combining data from multiple columns or fields in some manner, or splitting multiple words from a single column or field into multiple rows. Table 6 also contains an example where multiple words from a single field are returned in multiple rows. Additional columns in the table can be used to include locator columns that enable back-joins or introduce columns to guarantee the uniqueness of the results of the function invocation.

This exemplary transformation allows the indexing of the result of a complex transformation. It also enables more efficient querying for data for certain classes of queries. One such query could be written as follows:

Select * from tbl_peopleaddresses where SOMECOLUMNCONTAINS('Lake') or SOMECOLUMNCONTAINS('California');

In this query, the desired result is to find people who have some association with the word 'Lake' or the word 'California'. This association could be an exact column match for any of the columns in the table, or it could be the result of additional, potentially user-defined logic over the data in the table. In this example, 'Lake' is the second word of one field associated with the record containing 'Sara', while 'California' is related to the record containing 'Bob'. This logic is encapsulated in the function 'SOMECOLUMNCONTAINS', but it could be used in any searching context. For example, the same logic could be applied using the SQL function 'LIKE', though other functions can use this invention in similar ways.

The query processor can use an indexed view created over the results of this function invocation to efficiently solve queries containing LIKE or SOMECOLUMNCONTAINS. This logic desirably needs only to use the matching logic to efficiently find the indexed view containing the results of this particular function invocation over data.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific operating systems, are herein contemplated, especially as the number of wireless networked devices continues to proliferate. Therefore, the present invention should not be limited to any single embodiment, but rather construed in breadth and scope in accordance with the appended claims.

What is claimed is:

1. A method implemented on a computer for querying data residing in a base table, comprising:
   receiving a query;
   receiving an indexed view for a functional invocation over the data, the functional invocation comprising a table valued function;
   determining if the query can be satisfied by the index view by determining if the query matches the index view;
   applying the indexed view as an index to the functional invocation over the data if the query can be satisfied by the index view;
   introducing a back-join to the indexed view and applying the indexed view as an index to the functional invocation over the data if the query cannot be satisfied by the index view; and
   determining and storing a query result using the index to the functional invocation over the data.

2. The method of claim 1, wherein determining the query result comprises performing an unnesting operation on nested data.

3. The method of claim 2, wherein the unnesting operation is a cross apply unnest operation.

4. The method of claim 2, wherein performing the unnesting operation provides an unnested result, and further comprising indexing a view on the unnested result.

5. The method of claim 1, wherein the data comprises XML valued data fields.

6. The method of claim 1, wherein the data comprises multiple columns or multiple fields of a complex structure.

* * * * *